(12) United States Patent
Kimura et al.

(10) Patent No.: US 11,686,978 B2
(45) Date of Patent: Jun. 27, 2023

(54) DISPLAY DEVICE

(71) Applicant: Japan Display Inc., Tokyo (JP)

(72) Inventors: Shunichi Kimura, Tokyo (JP);
Toshiharu Matsushima, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/953,437

(22) Filed: Sep. 27, 2022

(65) Prior Publication Data

US 2023/0100929 A1 Mar. 30, 2023

(30) Foreign Application Priority Data

Sep. 28, 2021 (JP) .............................. JP2021-158138

(51) Int. Cl.
*G02F 1/1337* (2006.01)
*G02F 1/1368* (2006.01)
*G02F 1/1343* (2006.01)
*G02F 1/1347* (2006.01)
*G02F 1/1335* (2006.01)

(52) U.S. Cl.
CPC ...... *G02F 1/133757* (2021.01); *G02F 1/1347* (2013.01); *G02F 1/1368* (2013.01); *G02F 1/133504* (2013.01); *G02F 1/133519* (2021.01); *G02F 1/133528* (2013.01); *G02F 1/134309* (2013.01)

(58) Field of Classification Search
CPC ................................................. G02F 1/133757
See application file for complete search history.

(56) References Cited

U.S. PATENT DOCUMENTS

| 6,075,581 | A | * | 6/2000 | Shirochi | ........... | G02F 1/133504 |
| | | | | | | 359/489.06 |
| 2015/0160520 | A1 | * | 6/2015 | Matsushima | ..... | G02F 1/134309 |
| | | | | | | 349/123 |
| 2020/0057302 | A1 | * | 2/2020 | Muravev | ................. | G01B 11/00 |

FOREIGN PATENT DOCUMENTS

JP 2015-114493 A 6/2015

* cited by examiner

*Primary Examiner* — Edmond C Lau
(74) *Attorney, Agent, or Firm* — Xsensus LLP (57) ABSTRACT

According to one embodiment, a display device includes an illumination device, a display panel, a first polarizer attached to the display panel, a second polarizer attached to the display panel, and a transmissive diffraction grating provided in a location between the illumination device and the first polarizer or in a location facing the second polarizer. The diffraction grating includes a third substrate, a fourth substrate, and a second liquid crystal layer provided between the third substrate and the fourth substrate, containing a plurality of liquid crystal molecules, and cured in a state where alignment directions of the liquid crystal molecules are fixed.

10 Claims, 12 Drawing Sheets

DISPLAY DEVICE

CROSS-REFERENCE TO RELATED APPLICATIONS

This application is based upon and claims the benefit of priority from Japanese Patent Application No. 2021-158138, filed Sep. 28, 2021, the entire contents of which are incorporated herein by reference.

FIELD

Embodiments described herein relate generally to a display device.

BACKGROUND

A known example of display devices is a liquid crystal display device in an in-plane switching (IPS) mode or fringe field switching (FFS) mode. In this liquid crystal display device having a lateral electric field system, one of substrates which face each other via a liquid crystal layer comprises pixel electrodes and a common electrode. The liquid crystal molecules of the liquid crystal layer are driven by using an electric field generated between the pixel electrode and the common electrode.

In recent years, compared to the conventional FFS mode, a system for accelerating the response speed and improving the stability of alignment has been suggested.

DETAILED DESCRIPTION

In general, according to one embodiment, a display device comprises an illumination device, a first substrate comprising a first insulating substrate, a switching element provided on the first insulating substrate, a common electrode provided over a plurality of pixels, a pixel electrode provided in each pixel, electrically connected to the switching element and facing the common electrode, and a first alignment film, a second substrate comprising a second insulating substrate and a second alignment film, and facing the first substrate, a first liquid crystal layer provided between the first substrate and the second substrate, a first polarizer attached to the first substrate, a second polarizer attached to the second substrate, and a transmissive diffraction grating provided in a location between the illumination device and the first polarizer or in a location facing the second polarizer. The pixel electrode comprises a plurality of branch portions extending in a first direction and arranged with a predetermined pitch in a second direction, and a trunk portion extending in the second direction and connected to the branch portions. The diffraction grating comprises a third substrate comprising a third insulating substrate and a third alignment film, a fourth substrate comprising a fourth insulating substrate and a fourth alignment film, and a second liquid crystal layer provided between the third substrate and the fourth substrate, containing a plurality of liquid crystal molecules, and cured in a state where alignment directions of the liquid crystal molecules are fixed.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the drawings, in order to facilitate understanding, an X-axis, a Y-axis and a Z-axis orthogonal to each other are shown depending on the need. A direction parallel to the X-axis is referred to as an X-direction or a first direction. A direction parallel to the Y-axis is referred to as a Y-direction or a second direction. A direction parallel to the Z-axis is referred to as a Z-direction or a third direction. The plane defined by the X-axis and the Y-axis is referred to as an X-Y plane. When the X-Y plane is viewed, the appearance is defined as a plan view. The first direction X and the second direction Y correspond to, for example, directions parallel to the substrates included in a display device DSP. The third direction Z corresponds to the thickness direction of the display device DSP.

Figure 1:
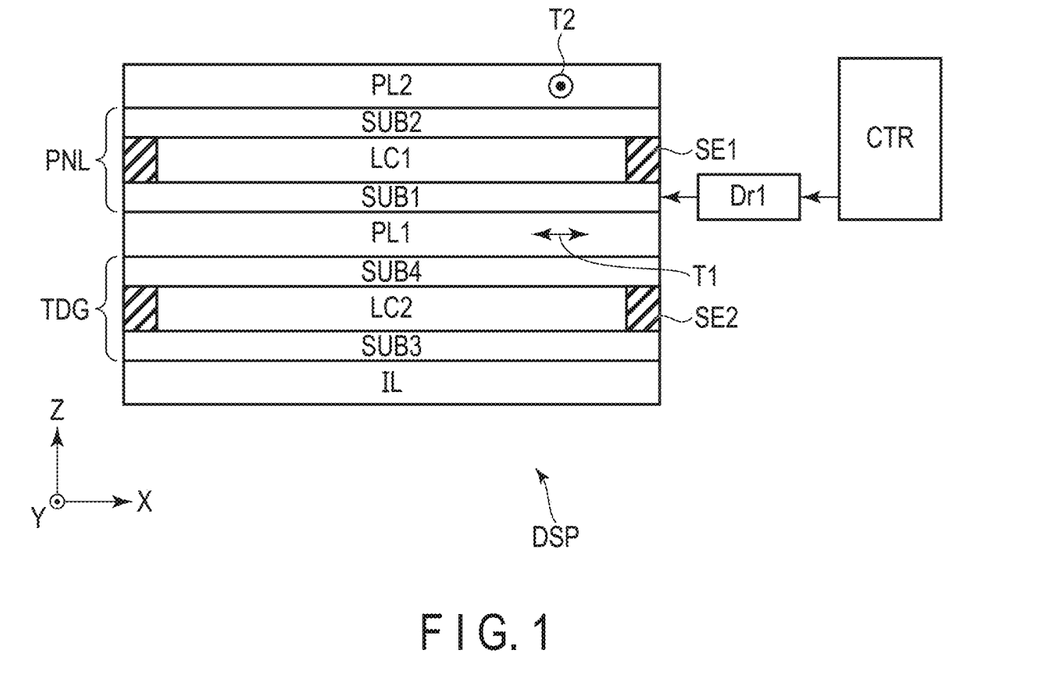
FIG. 1 is a diagram showing a configuration example of a display device DSP according to an embodiment.

FIG. 1 is a diagram showing a configuration example of the display device DSP according to an embodiment.

The display device DSP comprises an illumination device IL, a transmissive diffraction grating (hereinafter, simply referred to as a diffraction grating) TDG, a first polarizer PL1, a display panel PNL and a second polarizer PL2.

Both the diffraction grating TDG and the display panel PNL are liquid crystal panels. The illumination device IL, the diffraction grating TDG, the first polarizer PL1, the display panel PNL and the second polarizer PL2 are arranged in this order in the third direction Z. Thus, whereas the display panel PNL is located between the first polarizer PL1 and the second polarizer PL2, the diffraction grating TDG is not located between the first polarizer PL1 and the second polarizer PL2. In the example shown in FIG. 1, the diffraction grating TDG is provided between the illumination device IL and the first polarizer PL1. The illumination device IL is configured to illuminate the display panel PNL. The illumination light emitted from the illumination device IL should be preferably collimated in the normal direction of the display device DSP, in other words, in the third direction Z.

The display panel PNL comprises a first substrate SUB1, a second substrate SUB2 facing the first substrate SUB1 in the third direction Z, and a first liquid crystal layer LC1 provided between the first substrate SUB1 and the second substrate SUB2. The first substrate SUB1 is attached to the second substrate SUB2 by a sealant SE1. The first liquid crystal layer LC1 is sealed by the sealant SE1. The display panel PNL is driven by a driver Dr1. The driver Dr1 is controlled by a controller CTR.

The first polarizer PL1 is attached to the first substrate SUB1. The second polarizer PL2 is attached to the second substrate SUB2. For example, the first polarizer PL1 and the second polarizer PL2 are provided so as to satisfy the relationship of crossed-Nicols. In other words, the transmission axis T1 of the first polarizer PL1 and the transmission axis T2 of the second polarizer PL2 are orthogonal to each other in the X-Y plane. For example, the transmission axis T1 is parallel to the first direction X, and the transmission axis T2 is parallel to the second direction Y.

The diffraction grating TDG comprises a third substrate SUB3, a fourth substrate SUB4 facing the third substrate SUB3 in the third direction Z, and a second liquid crystal layer LC2 provided between the third substrate SUB3 and the fourth substrate SUB4. The third substrate SUB3 is attached to the fourth substrate SUB4 by a sealant SE2. The second liquid crystal layer LC2 is sealed by the sealant SE2. In the example shown in FIG. 1, in the third direction Z, the third substrate SUB3 faces the illumination device IL, and the fourth substrate SUB4 faces the first polarizer PL1. It should be noted that a gap may be defined between the fourth substrate SUB4 and the first polarizer PL1.

This diffraction grating TDG is not driven by the driver or not controlled by the controller CTR. The details are described later.

Figure 2:
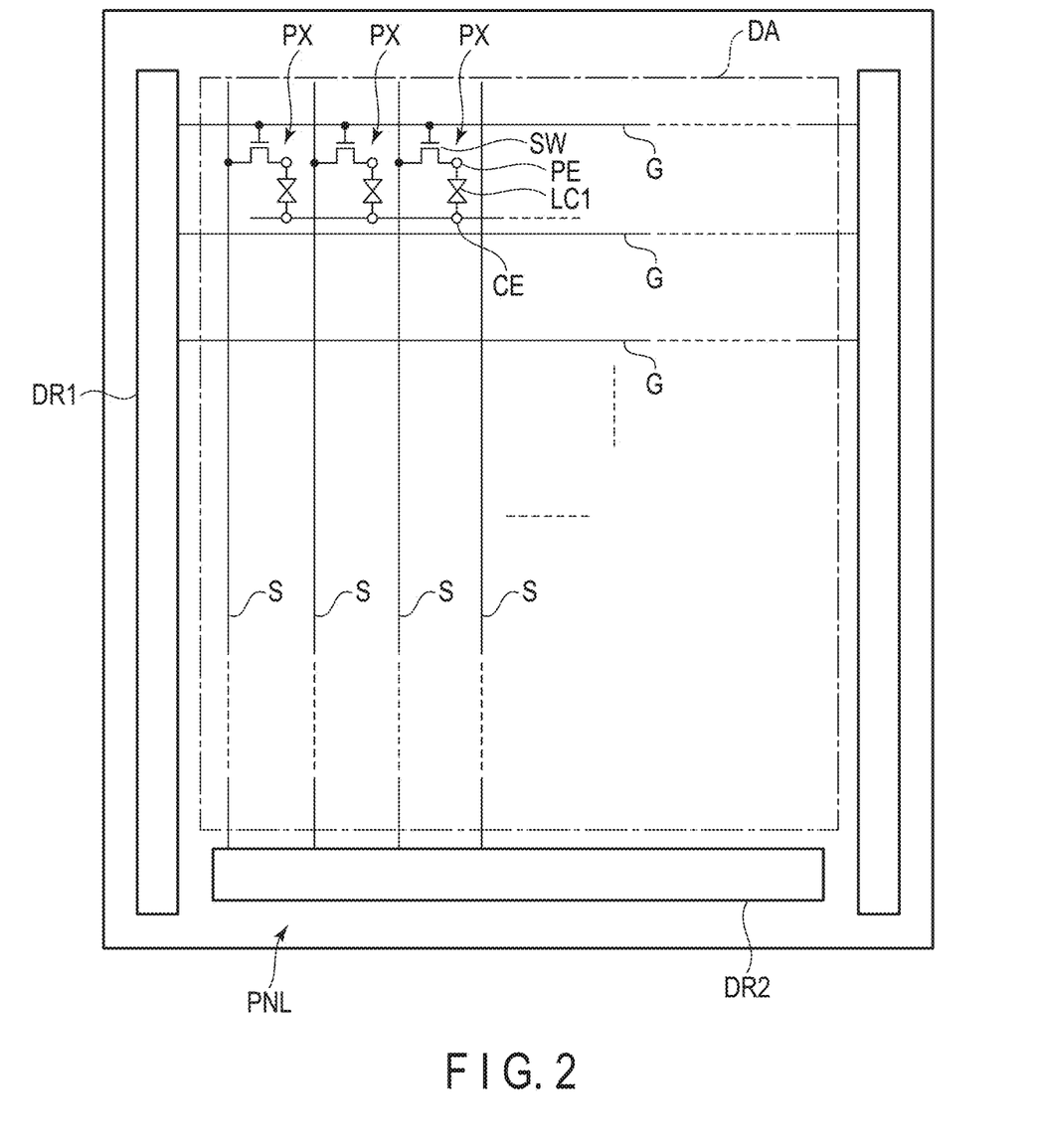
FIG. 2 is a diagram showing an example of the display panel PNL shown in FIG. 1.

FIG. 2 is a diagram showing an example of the display panel PNL shown in FIG. 1.

The display panel PNL comprises a plurality of pixels PX, a plurality of scanning lines G and a plurality of signal lines S in a display area DA which displays an image. The scanning lines G and the signal lines S intersect each other. The display panel PNL comprises a first driver DR1 and a second driver DR2 outside the display area DA. The scanning lines G are electrically connected to the first driver DR1. The signal lines S are electrically connected to the second driver DR2. The first driver DR1 and the second driver DR2 are included in the driver Dr1 shown in FIG. 1 and controlled by the controller CTR.

Each pixel PX comprises a switching element SW and a pixel electrode PE. The switching element SW is electrically connected to the scanning line G and the signal line S. The pixel electrode PE is electrically connected to the switching element SW. A common electrode CE is provided over a plurality of pixels PX.

The pixels PX shown here are called subpixels, color pixels, etc. Each pixel PX comprises a color filter, and is equivalent to, for example, a red pixel which displays red, a green pixel which displays green, a blue pixel which displays blue or a white pixel which displays white. Each of these pixels PX is defined by, for example, two adjacent scanning lines G and two adjacent signal lines S.

In the display panel PNL, the first driver DR1 supplies a scanning signal to each scanning line G. The second driver DR2 supplies a video signal to each signal line S. In the switching element SW electrically connected to a scanning line G to which a scanning signal is supplied, the signal line S is electrically connected to the pixel electrode PE, and voltage based on the video signal supplied to the signal line S is applied to the pixel electrode PE. The first liquid crystal layer LC1 is driven by an electric field generated between the pixel electrode PE and the common electrode CE.

Figure 3:
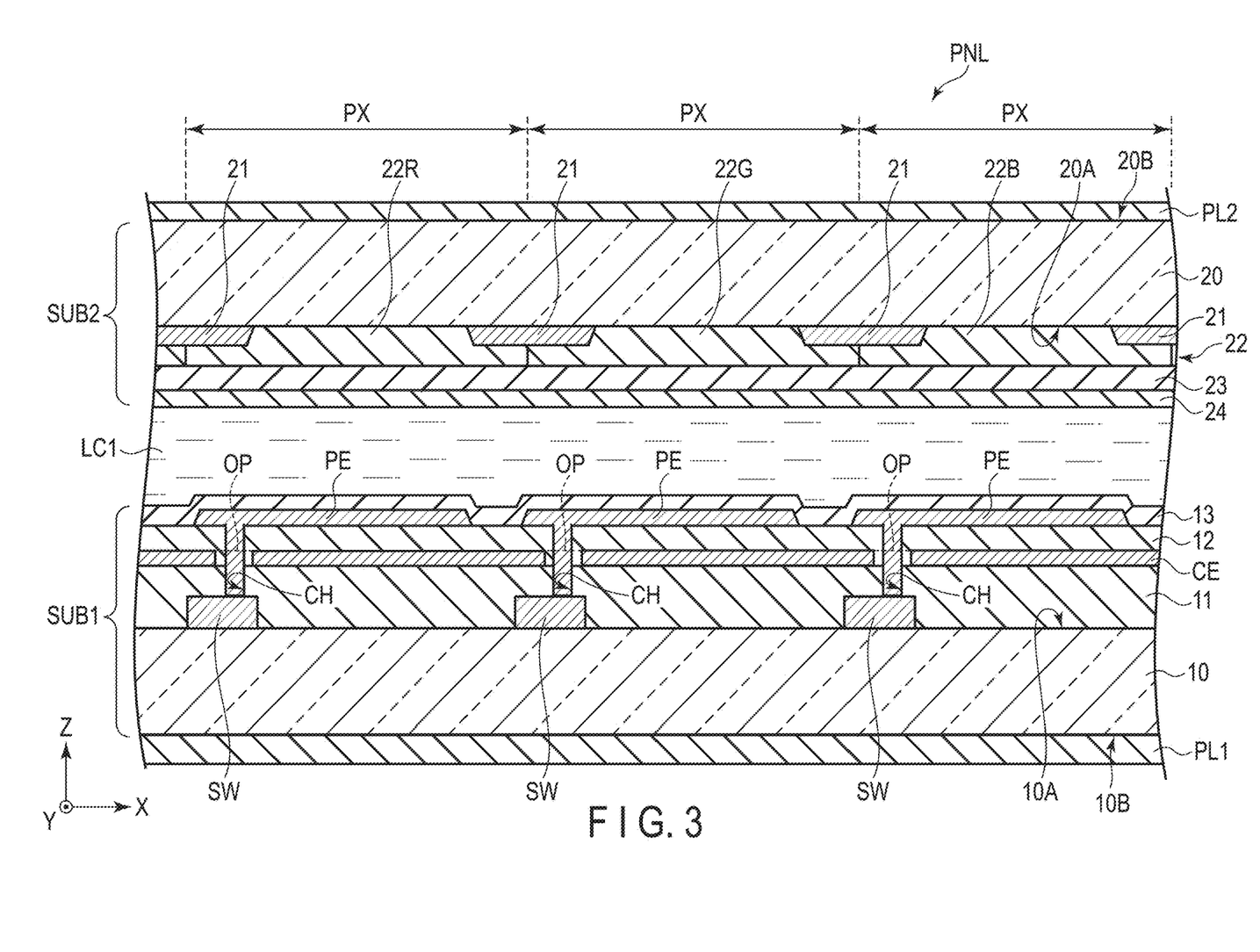
FIG. 3 is a cross-sectional view showing an example of the configuration of the display panel PNL shown in FIG. 2.

FIG. 3 is a cross-sectional view showing an example of the configuration of the display panel PNL shown in FIG. 2. Here, this specification explains the configuration of the display panel PNL with reference to the X-Z section defined by the first direction X and the third direction Z.

The display panel PNL comprises the first substrate SUB1, the second substrate SUB2, and the first liquid crystal layer LC1 held between the first substrate SUB1 and the second substrate SUB2.

The first substrate SUB1 comprises a first insulating substrate 10, insulating layers 11 and 12 and a first alignment film 13 in addition to the switching elements SW, the pixel electrodes PE, the common electrode CE, etc. The first substrate SUB1 further comprises the scanning lines G, the signal lines S, the first driver DR1, the second driver DR2 and the like shown in FIG. 2. The first insulating substrate 10 comprises an inner surface 10A facing the first liquid crystal layer LC1, and an outer surface 10B on the opposite side of the inner surface 10A.

The switching elements SW are simplified in the figure. The switching elements SW are provided on the inner surface 10A of the first insulating substrate 10 and covered with the insulating layer 11. Here, the illustration of the scanning lines G and signal lines S connected to the switching elements SW is omitted. However, in the actual case, the insulating layer 11 includes a plurality of insulating layers, and each switching element SW includes a semiconductor layer or various electrodes provided between these insulating layers, and further, various wiring lines are provided between the insulating layers.

The common electrode CE is located on the insulating layer 11 and provided over a plurality of pixels PX. The common electrode CE is covered with the insulating layer 12. The pixel electrode PE of each pixel PX is provided on the insulating layer 12 and faces the common electrode CE via the insulating layer 12. Each pixel electrode PE is electrically connected to a corresponding switching element SW via a corresponding opening OP of the common electrode CE and a corresponding contact hole CH penetrating the insulating layers 11 and 12. The first alignment film 13 covers the pixel electrodes PE and is in contact with the first liquid crystal layer LC1.

The second substrate SUB2 comprises a second insulating substrate 20, a light-shielding layer 21, a color filter layer 22, an overcoat layer 23 and a second alignment film 24. The second insulating substrate 20 comprises an inner surface 20A facing the first liquid crystal layer LC1, and an outer surface 20B on the opposite side of the inner surface 20A.

The light-shielding layer 21 is provided on the inner surface 20A and is located in the boundary of adjacent pixels PX. The color filter 22 comprises a red color filter 22R, a green color filter 22G and a blue color filter 22B. The overcoat layer 23 covers the color filter layer 22. The second alignment film 24 covers the overcoat layer 23 and is in contact with the first liquid crystal layer LC1.

The first polarizer PL1 is attached to the outer surface 10B of the first insulating substrate 10. The second polarizer PL2 is attached to the outer surface 20B of the second insulating substrate 20.

The first insulating substrate 10 and the second insulating substrate 20 are transparent substrates such as glass substrates or resinous substrates having a light transmitting property. The pixel electrodes PE and the common electrode CE are transparent electrodes formed of, for example, a transparent conductive material such as indium tin oxide (ITO) or indium zinc oxide (IZO). Both the first alignment film 13 and the second alignment film 24 are horizontal alignment films having an alignment restriction force along the X-Y plane, and are, for example, optical alignment films to which optical alignment treatment has been applied. It should be noted that the first alignment film 13 and the second alignment film 24 may be alignment films to which rubbing treatment has been applied.

Figure 4:
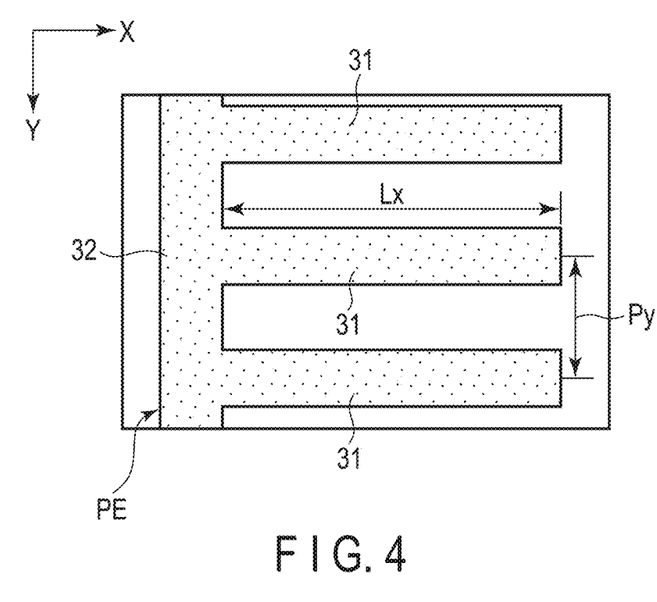
FIG. 4 is a plan view showing an example of each pixel electrode PE shown in FIG. 3.

FIG. 4 is a plan view showing an example of each pixel electrode PE shown in FIG. 3.

The pixel electrode PE comprises a plurality of branch portions 31 extending in the first direction X, and a single trunk portion 32 extending in the second direction Y. The branch portions 31 and the trunk portion 32 are integrally formed and are connected to each other.

All of the branch portions 31 are connected to one side of the trunk portion 32. In other words, all of the branch portions 31 extend in the same direction along the first direction X from the trunk portion 32. In the example shown in the figure, all of the branch portions 31 extend to the right side of the figure from the trunk portion 32. For example, the length Lx of each branch portion 31 in the first direction X is approximately 5 μm. The pitch Py of the branch portions 31 in the second direction Y is approximately 5 to 6 μm. The pixel electrode PE having this size is suitable for, for example, a high-definition panel of approximately 1000 ppi.

Each branch portion 31 has, for example, a rectangular shape extending in the first direction X as shown in the figure. However, the shape of each branch portion 31 is not limited to the example shown in the figure.

Figure 5:
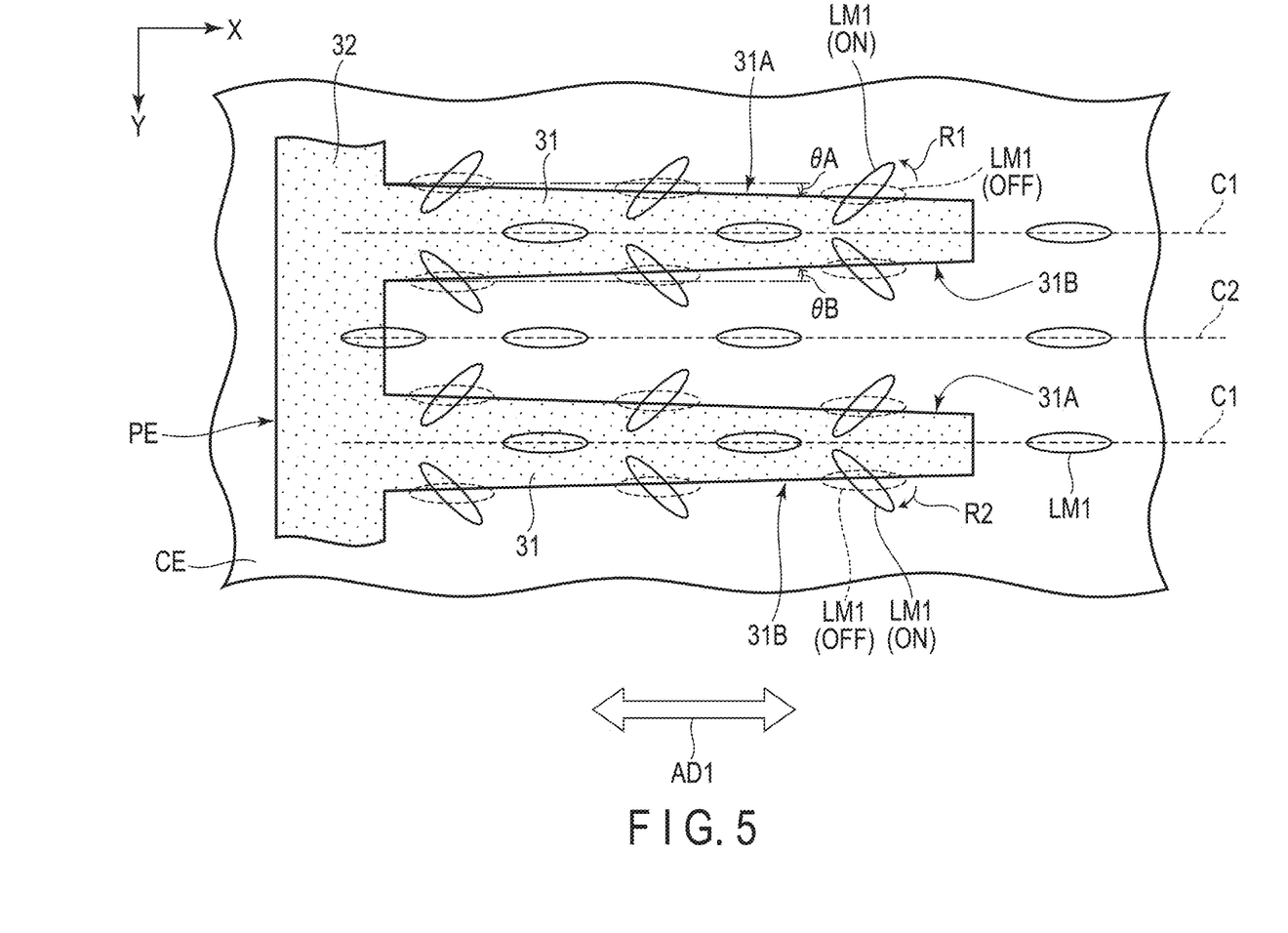
FIG. 5 is a diagram showing the alignment state of liquid crystal molecules LM1 when a first liquid crystal layer LC1 has positive dielectric anisotropy.
Figure 6:
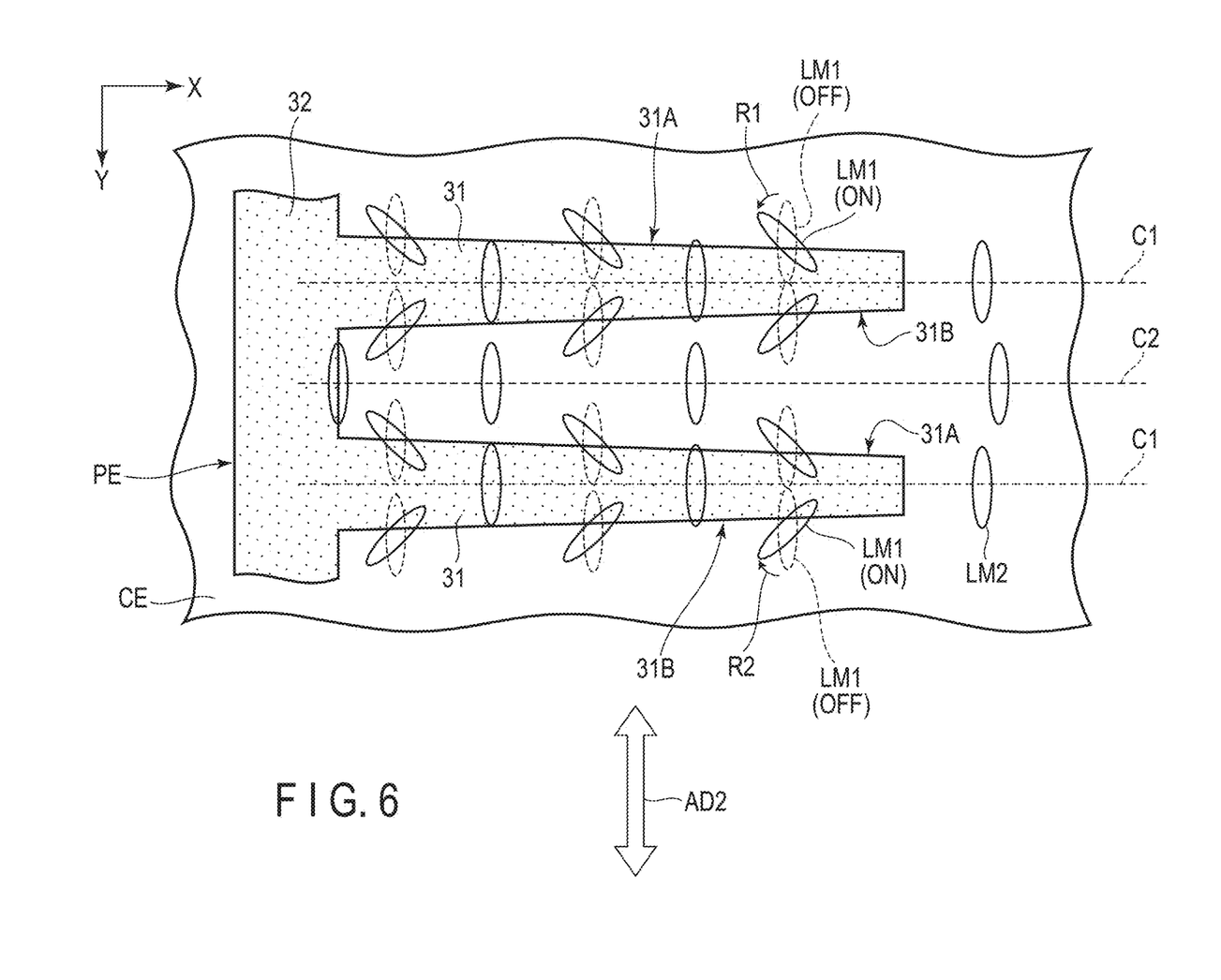
FIG. 6 is a diagram showing the alignment state of liquid crystal molecules LM1 when the first liquid crystal layer LC1 has negative dielectric anisotropy.

Now, this specification explains the operation principle of the display panel PNL with reference to FIG. 5 and FIG. 6.

Liquid crystal molecules LM1 contained in the first liquid crystal layer LC1, the pixel electrode PE and the common electrode CE are explained with reference to each figure. A state in which no electric field is formed between the pixel electrode PE and the common electrode CE is referred to as an off time. A state in which an electric field is formed between the pixel electrode PE and the common electrode CE is referred to as an on time. In each figure, the alignment state of liquid crystal molecules LM1 at an off time is shown by dotted lines, and the alignment state of liquid crystal molecules LM1 at an on time is shown by solid lines.

Regarding the pixel electrode PE, each branch portion 31 has a shape tapered toward the distal end of the right side of each figure. The branch portions 31 comprise edges 31A and 31B facing each other in the second direction Y. Each edge 31A inclines at angle θA clockwise with respect to the axis parallel to the first direction X. Each edge 31B inclines at angle θB counterclockwise with respect to the axis parallel to the first direction X. Angles θA and θB are substantially equal to each other, and are, for example, angles greater than or equal to 1 degree.

FIG. 5 is a diagram showing the alignment state of liquid crystal molecules LM1 when the first liquid crystal layer LC1 has positive dielectric anisotropy.

Initial alignment direction AD1 of liquid crystal molecules LM1 at an off time is parallel to the first direction X. Thus, as shown by dotted lines, liquid crystal molecules LM1 are initially aligned such that the long axes are parallel to the first direction X. Initial alignment direction AD1 is parallel to the extension direction of the branch portions 31. To form this initial alignment state, the alignment treatment direction of the first and second alignment films 13 and 24 which are in contact with the first liquid crystal layer LC1 is parallel to the first direction X.

At an on time, in the X-Y plane, an electric field intersecting with the edges 31A and 31B is generated. Liquid crystal molecules LM1 rotate in the X-Y plane such that the long axes are substantially parallel to the electric field. For example, each liquid crystal molecule LM1 located near each edge 31A rotates in counterclockwise rotational direction R1. Each liquid crystal molecule LM1 located near each edge 31B rotates in clockwise rotational direction R2. Thus, regarding each branch portion 31, the rotational direction of liquid crystal molecules LM1 on the edge 31A side is different from that on the edge 31B side.

Near center line C1 between the edges 31A and 31B of each branch portion 31, liquid crystal molecules LM1 rotating in rotational direction R1 compete against liquid crystal molecules LM1 rotating in rotational direction R2. Thus, liquid crystal molecules LM1 located in such a region hardly rotate and maintain the initial alignment state at an on time.

Similarly, liquid crystal molecules LM1 hardly rotate at an on time near center line C2 between the edge 31A of one of two branch portions 31 adjacent to each other in the second direction Y and the edge 31B of the other branch portion 31.

FIG. 6 is a diagram showing the alignment state of liquid crystal molecules LM1 when the first liquid crystal layer LC1 has negative dielectric anisotropy.

Initial alignment direction AD2 of liquid crystal molecules LM1 at an off time is parallel to the second direction Y. Thus, as shown by dotted lines, liquid crystal molecules LM1 are initially aligned such that the long axes are parallel to the second direction Y. Initial alignment direction AD2 is orthogonal to the extension direction of the branch portions 31. To form this initial alignment state, the alignment treatment direction of the first and second alignment films 13 and 24 which are in contact with the first liquid crystal layer LC1 is parallel to the second direction Y.

Liquid crystal molecules LM1 at an on time rotate such that the long axes are substantially orthogonal to an electric field in the X-Y plane. For example, each liquid crystal molecule LM1 located near each edge 31A rotates in counterclockwise rotational direction R1. Each liquid crystal molecule LM1 located near each edge 31B rotates in clockwise rotational direction R2.

By contrast, liquid crystal molecules LM1 hardly rotate and maintain the initial alignment state at an on time near center line C1 of each branch portion 31 and center line C2 between the branch portions 31 which are adjacent to each other in the second direction Y.

Thus, liquid crystal molecules LM1 rotate in the same direction near the edge 31A of each branch portion 31. Similarly, liquid crystal molecules LM1 rotate in the same direction near the edge 31B of each branch portion 31. However, the rotational direction of liquid crystal molecules LM1 located near the edge 31B is the opposite direction of the rotational direction of liquid crystal molecules LM1 located near the edge 31A. For this reason, a region in which liquid crystal molecules LM1 do not rotate is periodically formed in the second direction Y. Thus, compared to the general FFS mode, the response speed when voltage is applied is accelerated, and further, the rise of liquid crystal molecules LM1 by a longitudinal electric field is difficult to cause. Therefore, the alignment stability can be improved compared to a case where a positive liquid crystal layer is applied.

Now, this specification explains the transmissive diffraction grating TDG.

Figure 7:
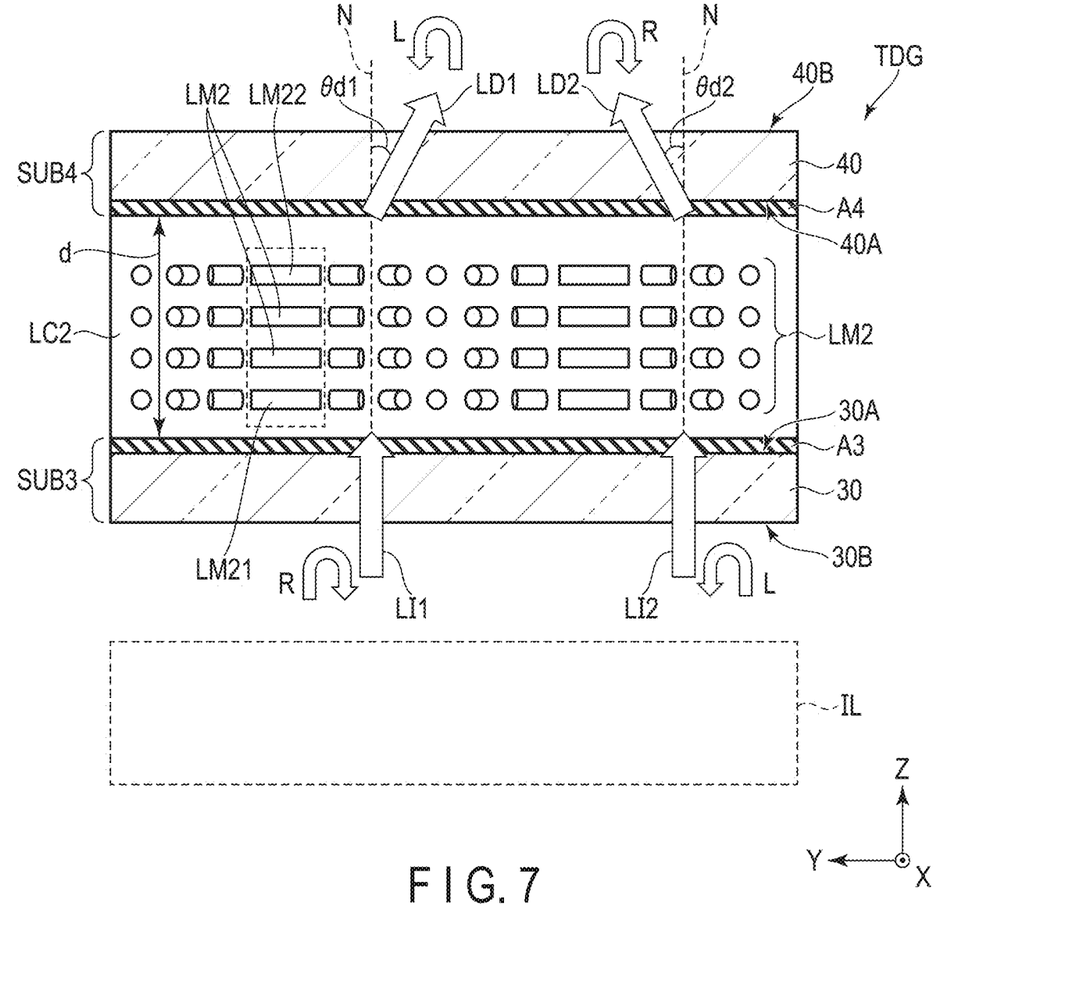
FIG. 7 is a cross-sectional view showing an example of the configuration of a diffraction grating TDG.

FIG. 7 is a cross-sectional view showing an example of the configuration of the diffraction grating TDG. Here, this specification explains the configuration of the diffraction grating TDG with reference to the Y-Z section defined by the second direction Y and the third direction Z.

The diffraction grating TDG comprises the third substrate SUB3, the fourth substrate SUB4, and the second liquid crystal layer LC2 held between the third substrate SUB3 and the fourth substrate SUB4.

The third substrate SUB3 comprises a third insulating substrate 30 and a third alignment film A3. The third insulating substrate 30 comprises an inner surface 30A facing the second liquid crystal layer LC2, and an outer surface 30B on the opposite side of the inner surface 30A. The third alignment film A3 is provided on the inner surface 30A and is in contact with the second liquid crystal layer LC2. Thus, the third alignment film A3 is in contact with the third insulating substrate 30. In other words, the third substrate SUB3 does not comprise an electrode or wiring line for driving the second liquid crystal layer LC2 between the third insulating substrate 30 and the third alignment film A3.

The fourth substrate SUB4 comprises a fourth insulating substrate 40 and a fourth alignment film A4. The fourth insulating substrate 40 comprises an inner surface 40A facing the second liquid crystal layer LC2, and an outer surface 40B on the opposite side of the inner surface 40A. The fourth alignment film A4 is provided on the inner surface 40A and is in contact with the second liquid crystal layer LC2. Thus, the fourth alignment film A4 is in contact with the fourth insulating substrate 40. In other words, the fourth substrate SUB4 does not comprise an electrode or wiring line for driving the second liquid crystal layer LC2 between the fourth insulating substrate 40 and the fourth alignment film A4.

The third insulating substrate 30 and the fourth insulating substrate 40 are transparent substrates such as glass substrates or resinous substrates having a light transmitting property. Both the third alignment film A3 and the fourth alignment film A4 are horizontal alignment films having an alignment restriction force along the X-Y plane. For example, the third alignment film A3 and the fourth alignment film A4 are optical alignment films to which optical alignment treatment has been applied.

The second liquid crystal layer LC2 has nematic liquid crystals in which the alignment direction is uniform in the third direction Z. Each of liquid crystal molecules LM2 contained in the second liquid crystal layer LC2 is aligned in a predetermined direction. The alignment directions of liquid crystal molecules LM2 arranged along the third alignment film A3 and the fourth alignment film A4 sequentially change in the second direction Y. This second liquid crystal layer LC2 is cured in a state where the alignment directions of liquid crystal molecules LM2 are fixed. The alignment pattern of liquid crystal molecules LM2 is described later. It should be noted that the alignment direction of a liquid crystal molecule in this specification is equivalent to the direction of the long axis of the liquid crystal molecule in the X-Y plane.

When the refractive anisotropy or birefringence of the liquid crystal layer LC2 is $\Delta n$ (the difference between refractive index ne relative to extraordinary light and refractive index no relative to ordinary light in liquid crystal molecules), and the thickness of the liquid crystal layer LC2 in the third direction Z is d, and the wavelength of diffracted light is $\lambda$, the retardation $\Delta n \cdot d$ of the second liquid crystal layer LC2 should be preferably $\lambda/2$.

When this specification focuses attention on the area surrounded by dotted lines, the alignment directions of liquid crystal molecules LM2 arranged in the third direction Z are parallel to each other. In other words, of liquid crystal molecules LM2, the alignment direction of liquid crystal molecule LM21 located near the third alignment film A3 is substantially coincident with the alignment direction of liquid crystal molecule LM22 located near the fourth alignment film A4. In addition, the alignment directions of the other liquid crystal molecules LM2 between liquid crystal molecule LM21 and liquid crystal molecule LM22 are substantially coincident with the alignment direction of liquid crystal molecule LM21.

Here, a diffraction phenomenon caused by the diffraction grating TDG is explained.

It is assumed that the illumination device IL shown by dotted lines emits unpolarized illumination light collimated in the third direction Z. This illumination light includes illumination light LI1 which is right-handed circularly polarized light R, and illumination light LI2 which is left-handed circularly polarized light L.

Illumination light LI1 and illumination light LI2 enter the diffraction grating TDG along the normal N of the diffraction grating TDG. Illumination light LI1 is converted into diffracted light LD1 which is left-handed circularly polarized light L after passing through the diffraction grating TDG. Illumination light LI2 is converted into diffracted light LD2 which is right-handed circularly polarized light R after passing through the diffraction grating TDG.

Diffraction angle θd1 of diffracted light LD1 is substantially equal to diffraction angle θd2 of diffracted light LD2. It should be noted that the diffraction direction of diffracted light LD1 is different from that of diffracted light LD2. In the example shown in the figure, diffracted light LD1 is diffracted to right with respect to the normal N, whereas diffracted light LD2 is diffracted to left with respect to the normal N.

Figure 8:
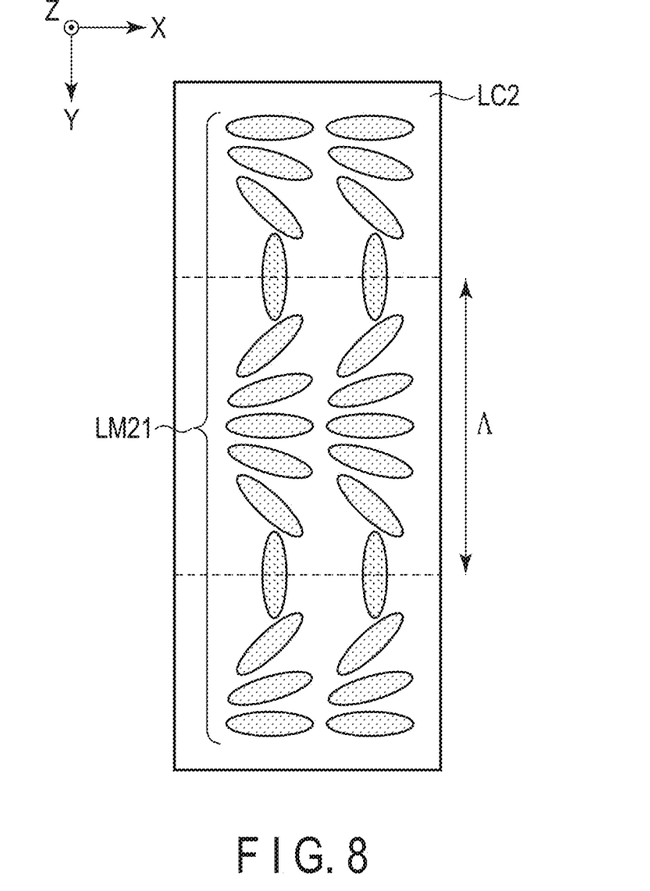
FIG. 8 is a plan view showing an example of the alignment pattern of liquid crystal molecules LM2 shown in FIG. 7.

FIG. 8 is a plan view showing an example of the alignment pattern of liquid crystal molecules LM2 shown in FIG. 7.

FIG. 8 shows, of liquid crystal molecules LM2 contained in the second liquid crystal layer LC2, the alignment pattern of liquid crystal molecules LM21 aligned near the interface between the second liquid crystal layer LC2 and the third alignment film A3.

In the second liquid crystal layer LC2, the alignment directions of liquid crystal molecules LM21 arranged along the second direction Y are different from each other. In other words, the spacial phase of the second liquid crystal layer LC2 in the X-Y plane differs along the second direction Y. For example, the alignment direction of each liquid crystal molecule LM21 sequentially changes clockwise at certain degrees along the second direction Y (from the top to bottom of the figure). Here, the change in the alignment directions of adjacent liquid crystal molecules LM21 is constant along the second direction Y.

Here, the interval between two liquid crystal molecules LM21 when the alignment direction of each liquid crystal molecule LM21 changes at 180 degrees in the second direction Y is defined as an alignment cycle Λ.

In the second liquid crystal layer LC2, the alignment directions of liquid crystal molecules LM21 arranged along the first direction X are substantially coincident with each other. In other words, the spacial phase of the second liquid crystal layer LC2 in the X-Y plane is substantially uniform in the first direction X.

Figure 9:
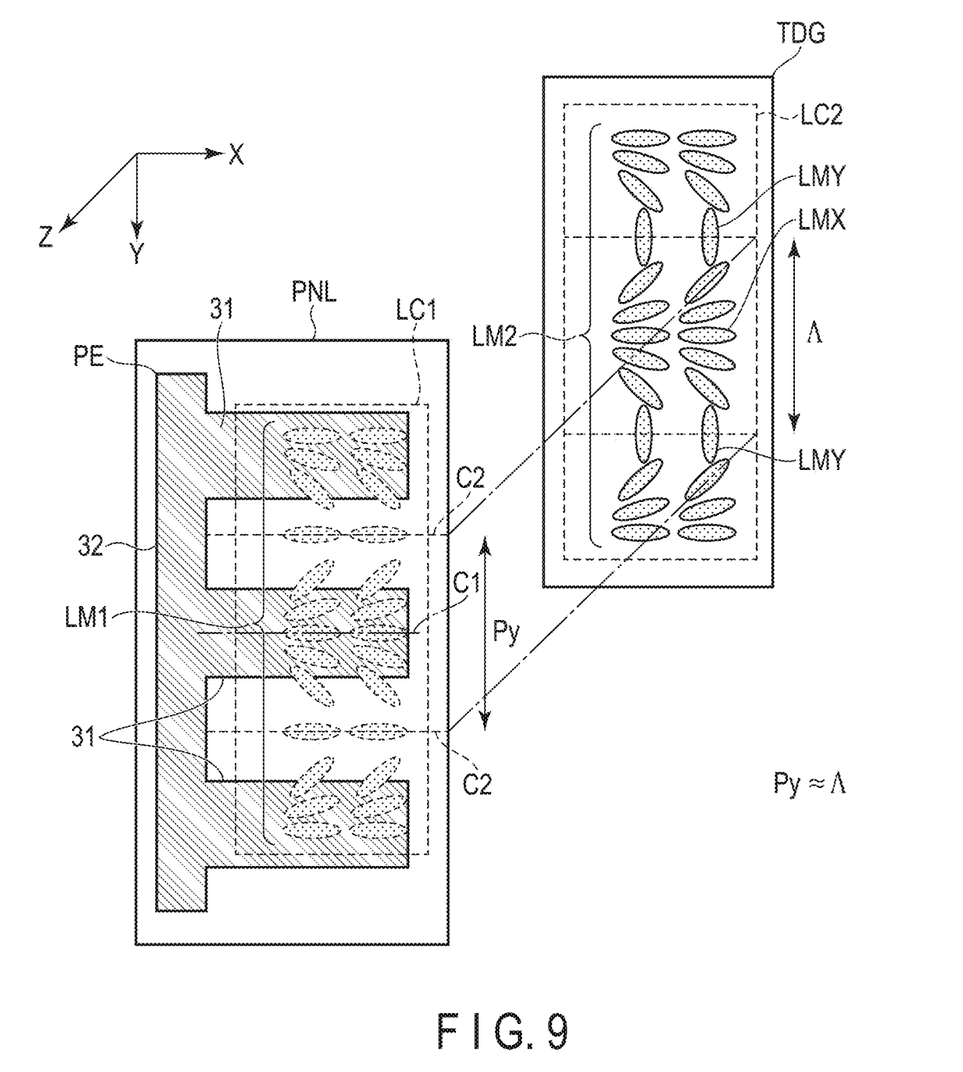
FIG. 9 is a diagram for explaining an example of a state in which the display panel PNL overlaps the diffraction grating TDG.

FIG. 9 is a diagram for explaining an example of a state in which the display panel PNL overlaps the diffraction grating TDG. The figure shows liquid crystal molecules LM1 at an on time by dotted lines in a case where the first liquid crystal layer LC1 is of a positive type. It should be noted that the first liquid crystal layer LC1 may be of a negative type as described above.

The alignment cycle Λ in the diffraction grating TDG is substantially equal to the pitch Py of the branch portions 31 in the display panel PNL (Λ≈Py). The alignment cycle Λ should be preferably equal to the pitch Py (Λ=Py). The alignment cycle Λ and the pitch Py are less than or equal to 10 μm, and are, for example, 5 to 6 μm.

The tolerance of the pitch Py relative to the alignment cycle Λ is less than or equal to 10% of the alignment cycle Λ or less than or equal to 10% of the pitch Py. In other words, the difference between the alignment cycle Λ and the pitch Py is less than or equal to 1 μm. For example, when the alignment cycle Λ is 9 μm, the pitch Py is 8 to 10 μm.

As described above, the second liquid crystal layer LC2 has a plurality of liquid crystal molecules LM2 in which the alignment direction sequentially changes. Liquid crystal molecules LM2 contain liquid crystal molecules LMX aligned in the first direction X, and liquid crystal molecules LMY aligned in the second direction Y. Liquid crystal molecules LMX overlap a single branch portion 31. Liquid crystal molecules LMY are located between two branch portions 31 which are adjacent to each other in the second direction Y. When the alignment cycle Λ is equal to the pitch Py, liquid crystal molecules LMX overlap center line C1 of the branch portion 31, and liquid crystal molecules LMY overlap center line C2 between the branch portions 31.

Figure 10:
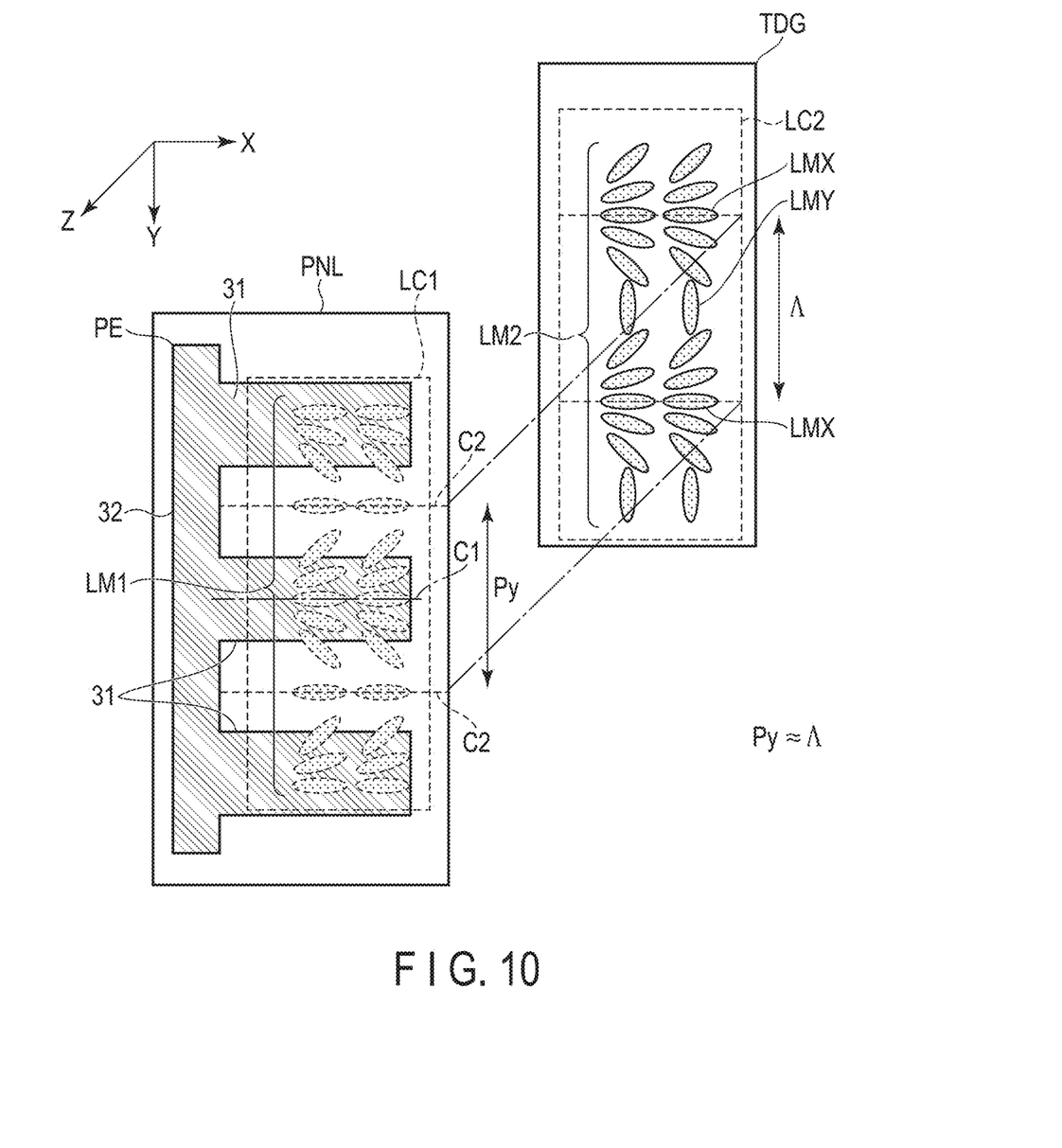
FIG. 10 is a diagram for explaining another example of a state in which the display panel PNL overlaps the diffraction grating TDG.

FIG. 10 is a diagram for explaining another example of a state in which the display panel PNL overlaps the diffraction grating TDG.

In the example shown in FIG. 10, in the second liquid crystal layer LC2 of the diffraction grating TDG, of liquid crystal molecules LM2, liquid crystal molecules LMY aligned in the second direction Y overlap a single branch portion 31. Of liquid crystal molecules LM2, liquid crystal molecules LMX aligned in the first direction X are located between two branch portions 31 which are adjacent to each other in the second direction Y. When the alignment cycle Λ is equal to the pitch Py, liquid crystal molecules LMY overlap center line C1 of the branch portion 31, and liquid crystal molecules LMX overlap center line C2 between the branch portions 31.

When the display panel PNL overlaps the diffraction grating TDG, the displacement of the diffraction grating TDG relative to the display panel PNL in either the first direction X or the second direction Y is allowed.

Now, this specification explains the optical effect of the display device DSP.

Figure 11:
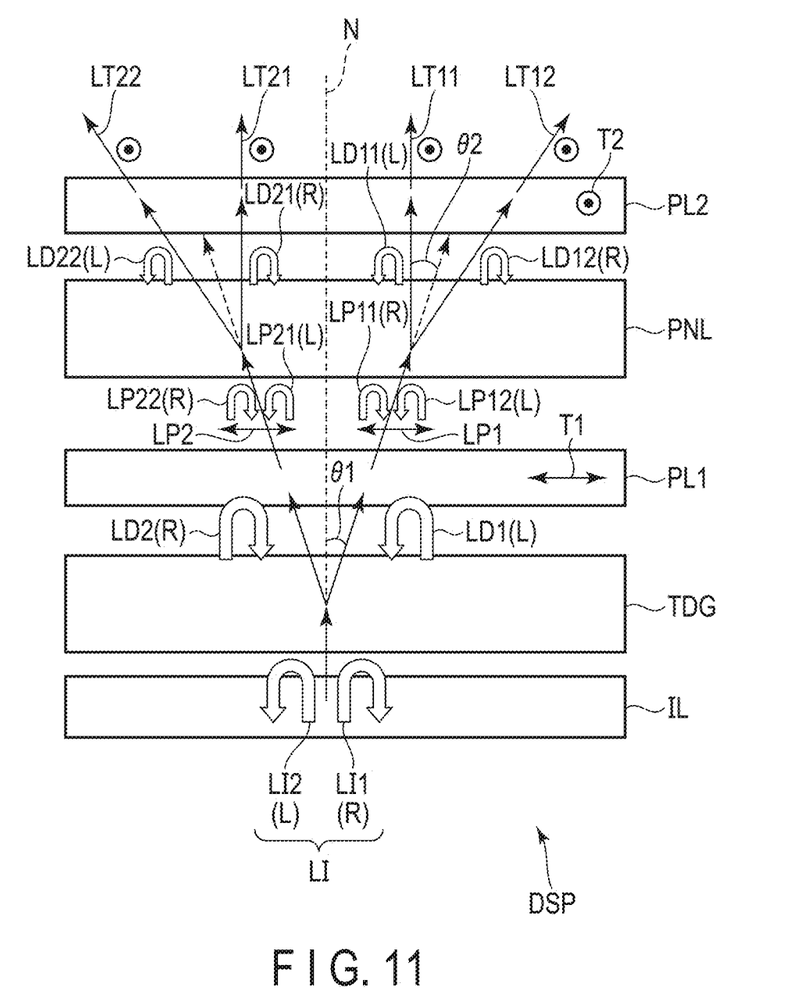
FIG. 11 is a diagram for explaining the optical effect of the display device DSP according to the embodiment.

FIG. 11 is a diagram for explaining the optical effect of the display device DSP according to the embodiment. Here, a case where the display panel PNL is in an on state is explained.

The illumination device IL emits unpolarized illumination light LI along the normal N of the display device DSP. In the following descriptions, this specification explains, of illumination light LI, illumination light LI1 which is right-handed circularly polarized light, and illumination light LI2 which is left-handed circularly polarized light. In the figure, (R) denotes right-handed circularly polarized light, and (L) denotes left-handed circularly polarized light.

Illumination light LI1 is converted into diffracted light LD1 which is left-handed circularly polarized light after passing through the diffraction grating TDG. Diffracted light LD1 enters the first polarizer PL1. The explanation of transmitted light (zero-order diffracted light) parallel to illumination light LI1 is omitted.

The first polarizer PL1 transmits, of diffracted light LD1, light LP1 which is linearly polarized light parallel to transmission axis T1. Light LP1 includes light LP11 which is right-handed circularly polarized light, and light LP12 which is left-handed circularly polarized light. This light LP1 enters the display panel PNL.

In the display panel PNL in an on state (ON), as described above, liquid crystal molecules LM2 located near the edge 31A uniformly rotate in counterclockwise rotational direction R1, and liquid crystal molecules LM2 located near the edge 31B uniformly rotate in clockwise rotational direction R2. At this time, the alignment state of liquid crystal molecules LM1 overlapping the entire pixel electrode PE functions as a diffraction grating.

Of light LP1 which entered the display panel PNL, light LP11 is converted into diffracted light LD11 which is left-handed circularly polarized light after passing through the display panel PNL. Light LP12 is converted into diffracted light LD12 which is right-handed circularly polarized light after passing through the display panel PNL. Diffracted light LD11 and diffracted light LD12 pass through the second polarizer PL2. Of diffracted light LD11, transmitted light LT11 which went straight through the second polarizer PL2 is linearly polarized light parallel to transmission axis T2. Similarly, of diffracted light LD12, transmitted light LT12 which went straight through the second polarizer PL2 is linearly polarized light parallel to transmission axis T2.

In other words, light LP1 which is linearly polarized light entering the display panel PNL passes through the display panel PNL and is subsequently converted into linearly polarized light including diffracted light LD11 and diffracted light LD12. After the conversion, the polarization axis of the linearly polarized light is orthogonal to the polarization axis of light LP1. Thus, the linearly polarized light including diffracted light LD11 and diffracted light LD12 passes through the second polarizer PL2 comprising transmission axis T2.

Since the transmitted light which goes straight through the display panel PNL is the same linearly polarized light as light LP1, the transmitted light is absorbed in the second polarizer PL2.

Illumination light LI2 is converted into diffracted light LD2 which is right-handed circularly polarized light after passing through the diffraction grating TDG. The first polarizer PL1 transmits, of diffracted light LD2, light LP2 which is linearly polarized light parallel to transmission axis T1. Light LP2 includes light LP21 which is left-handed circularly polarized light, and light LP22 which is right-handed circularly polarized light. This light LP2 enters the display panel PNL.

Of light LP2 which entered the display panel PNL, light LP21 is converted into diffracted light LD21 which is right-handed circularly polarized light after passing through the display panel PNL. Light LP22 is converted into diffracted light LD22 which is left-handed circularly polarized light after passing through the display panel PNL. Diffracted light LD21 and diffracted light LD22 pass through the second polarizer PL2. Of diffracted light LD21, transmitted light LT21 which went straight through the second polarizer PL2 is linearly polarized light parallel to transmission axis T2. Similarly, of diffracted light LD22, transmitted light LT22 which went straight through the second polarizer PL2 is linearly polarized light parallel to transmission axis T2.

Here, diffraction angle θ1 of diffracted light LD1 in the diffraction grating TDG is designed so as to be equal to diffraction angle θ2 of diffracted light LD11 in the display panel PNL.

Diffraction angle θ1 is determined by the alignment cycle Λ and the wavelength λ of the transmitted light as shown by the following relational equation.

$$\sin θ1 = λ/Λ$$

Diffraction angle θ2 is determined by the pitch Py and the wavelength λ of the transmitted light as shown by the following relational equation.

$$\sin θ1 = λ/Py$$

Thus, to make diffraction angle θ1 equal to diffraction angle θ2, the alignment cycle Λ is set so as to be equal to the pitch Py.

In the present embodiment, as explained with reference to FIG. 8 to FIG. 10, since the alignment cycle Λ is equal to the pitch Py, diffraction angle θ1 is equal to diffraction angle θ2. Thus, when the illumination light LI along the normal N enters the diffraction grating TDG, diffracted light LD11 and diffracted light LD21 passed through the display panel PNL are diffracted in the normal direction. By this configuration, transmitted light LT11 and transmitted light LT21 along the normal N can be obtained, and the brightness of the front side can be improved.

Figure 12:
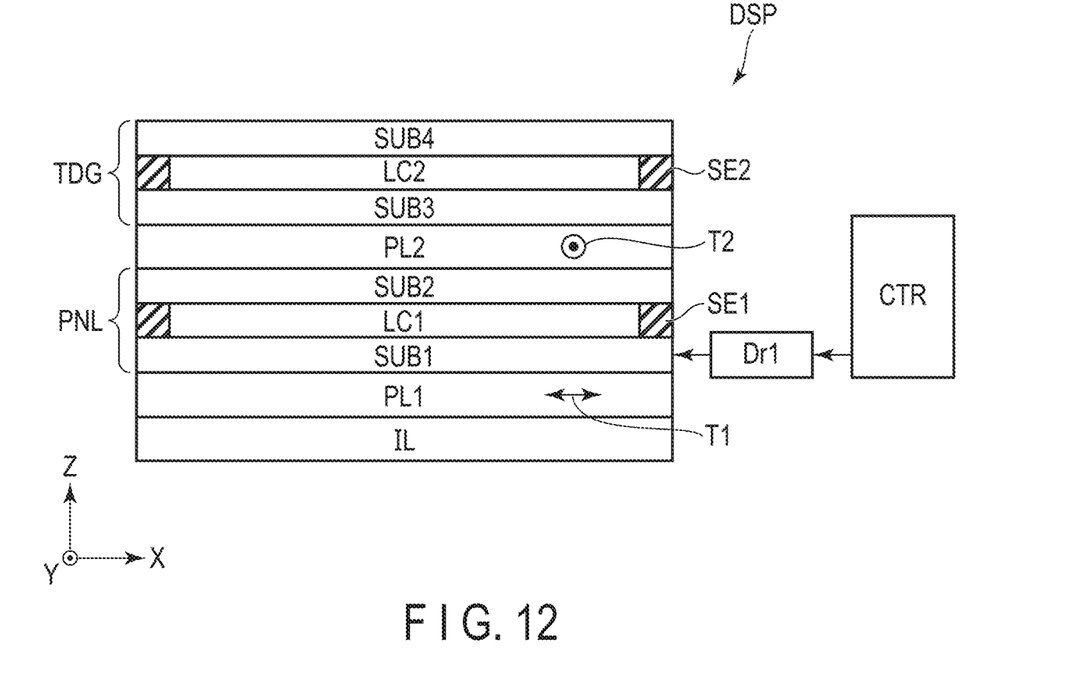
FIG. 12 is a diagram showing another configuration example of the display device DSP according to the embodiment.

FIG. 12 is a diagram showing another configuration example of the display device DSP according to the embodiment.

The configuration example shown in FIG. 12 is different from the configuration example shown in FIG. 1 in respect that the diffraction grating TDG is provided in a location facing the second polarizer PL2 in the third direction Z.

The illumination device IL, the first polarizer PL1, the display panel PNL, the second polarizer PL2 and the diffraction grating TDG are arranged in this order in the third direction Z. Thus, in the configuration example shown in FIG. 12, similarly, the diffraction grating TDG is not located between the first polarizer PL1 and the second polarizer PL2.

The diffraction grating TDG comprises the third substrate SUB3, the fourth substrate SUB4 facing the third substrate SUB3 in the third direction Z, and the second liquid crystal layer LC2 provided between the third substrate SUB3 and the fourth substrate SUB4. The third substrate SUB3 faces the second polarizer PL2 in the third direction Z. The details of the diffraction grating TDG are as described above.

In this configuration example, an effect similar to that of the above configuration example can be obtained.

As explained above, the present embodiment can provide a display device which can improve the brightness of the front side.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
an illumination device;
a first substrate comprising a first insulating substrate, a switching element provided on the first insulating substrate, a common electrode provided over a plurality of pixels, a pixel electrode provided in each pixel, electrically connected to the switching element and facing the common electrode, and a first alignment film;
a second substrate comprising a second insulating substrate and a second alignment film, and facing the first substrate;
a first liquid crystal layer provided between the first substrate and the second substrate;
a first polarizer attached to the first substrate;
a second polarizer attached to the second substrate; and
a transmissive diffraction grating provided in a location between the illumination device and the first polarizer or in a location facing the second polarizer, wherein
the pixel electrode comprises a plurality of branch portions extending in a first direction and arranged with a predetermined pitch in a second direction, and a trunk portion extending in the second direction and connected to the branch portions, and
the diffraction grating comprises:
a third substrate comprising a third insulating substrate and a third alignment film;
a fourth substrate comprising a fourth insulating substrate and a fourth alignment film; and
a second liquid crystal layer provided between the third substrate and the fourth substrate, containing a plurality of liquid crystal molecules, and cured in a state where alignment directions of the liquid crystal molecules are fixed.

2. The display device of claim 1, wherein
the alignment directions of the liquid crystal molecules arranged along the first direction are substantially parallel to each other,
the alignment directions of the liquid crystal molecules arranged along the second direction sequentially change,
of the liquid crystal molecules, the liquid crystal molecules aligned in the first direction overlap one of the branch portions, and
of the liquid crystal molecules, the liquid crystal molecules aligned in the second direction are located between the two branch portions which are adjacent to each other in the second direction.

3. The display device of claim 1, wherein
the alignment directions of the liquid crystal molecules arranged along the first direction are substantially parallel to each other,
the alignment directions of the liquid crystal molecules arranged along the second direction sequentially change,
of the liquid crystal molecules, the liquid crystal molecules aligned in the second direction overlap one of the branch portions, and of the liquid crystal molecules, the liquid crystal molecules aligned in the first direction are located between the two branch portions which are adjacent to each other in the second direction.

4. The display device of claim 1, wherein
the alignment directions of the liquid crystal molecules arranged along the first direction are substantially parallel to each other,
the alignment directions of the liquid crystal molecules arranged along the second direction sequentially change, and
when an interval between the liquid crystal molecules at which the alignment direction of the liquid crystal molecules arranged along the second direction changes by 180 degrees is defined as an alignment cycle, the alignment cycle is substantially equal to the pitch of the branch portions.

5. The display device of claim 4, wherein
the alignment cycle and the pitch are less than or equal to 10 μm.

6. The display device of claim 4, wherein
a difference between the alignment cycle and the pitch is less than or equal to 1 μm.

7. The display device of claim 1, wherein
the second substrate further comprises a light-shielding layer, a color filter layer and an overcoat layer between the second insulating substrate and the second alignment film,
the third alignment film is in contact with the third insulating substrate, and
the fourth alignment film is in contact with the fourth insulating substrate.

8. The display device of claim 1, wherein
the first liquid crystal layer has positive dielectric anisotropy, and
the liquid crystal molecules of the first liquid crystal layer are initially aligned in the first direction.

9. The display device of claim 1, wherein
the first liquid crystal layer has negative dielectric anisotropy, and
the liquid crystal molecules of the first liquid crystal layer are initially aligned in the second direction.

10. The display device of claim 4, wherein
a difference between the alignment cycle and the pitch is less than or equal to 10% of the alignment cycle or less than or equal to 10% of the pitch.

* * * * *